United States Patent

Ito et al.

[11] Patent Number: 5,983,872
[45] Date of Patent: Nov. 16, 1999

[54] ENGINE INTAKE SYSTEM FOR CONTROLLING INTERNAL EXHAUST GAS RECIRCULATION

[75] Inventors: Takeshi Ito; Tosiharu Hanajima, both of Iwata, Japan

[73] Assignee: Yamaha Hatsudoki Kabushiki Kaisha, Iwata, Japan

[21] Appl. No.: 08/946,421

[22] Filed: Oct. 7, 1997

[30] Foreign Application Priority Data

Oct. 8, 1996 [JP] Japan ................................ 8-267086

[51] Int. Cl.⁶ ........................... F02M 25/07; F02M 47/08
[52] U.S. Cl. ............................. 123/568.14; 123/184.53
[58] Field of Search .................. 123/568.14, 184.57, 123/184.53

[56] References Cited

U.S. PATENT DOCUMENTS

| | | | |
|---|---|---|---|
| 4,194,474 | 3/1980 | Endo | 123/119 A |
| 4,414,953 | 11/1983 | Matsumoto et al. | 123/406.69 |
| 4,702,203 | 10/1987 | Ohmi et al. | 123/184.35 |
| 4,726,340 | 2/1988 | Hasegawa et al. | 123/432 |
| 4,727,829 | 3/1988 | Kondo et al. | 123/184.35 |
| 4,765,285 | 8/1988 | Kobayashi | 123/184.35 |
| 4,905,646 | 3/1990 | Tanahashi | 123/568.14 |
| 5,018,485 | 5/1991 | Washizu et al. | 123/184.49 |
| 5,040,495 | 8/1991 | Harada et al. | 123/184.57 |
| 5,127,370 | 7/1992 | Suzuki et al. | 123/184.35 |
| 5,329,912 | 7/1994 | Mastumoto et al. | 123/568 |
| 5,515,832 | 5/1996 | Bidner et al. | 123/568.14 |
| 5,628,287 | 5/1997 | Brackett et al. | 123/184.57 |
| 5,660,155 | 8/1997 | Taue et al. | 123/184.54 |

FOREIGN PATENT DOCUMENTS

| | | |
|---|---|---|
| 111336 | 6/1984 | European Pat. Off. . |
| 669455 | 8/1995 | European Pat. Off. . |
| 671553 | 9/1995 | European Pat. Off. . |

OTHER PUBLICATIONS

Patent Abstract of Japan, vol. 10, No. 353 (M539), Nov. 28, 1986 & JP 61 152923 A (Toyota Motor Corp). Jul. 11, 1986.

"Engine intake tuning", Research Disclosure, No. 267, Jul. 1986, Emsworth, Hampshire, GB pp. 428–430, XP02064613.

Patent Abstract of Japan, vol. 11, No. 310 (M630), Oct. 9, 1987 & JP 62 096726 A (Mazda Motor Corp), May 6, 1987.

Patent Abstract of Japan, vol. 95, No. 2, Mar. 31, 1995 & JP 06 307248 A (Kumimoto Murase, Nov. 1, 1994.

European Search Report dated May 28, 1995.

*Primary Examiner*—Tony M. Argenbright
*Assistant Examiner*—Arnold Castro
*Attorney, Agent, or Firm*—Knobbe, Martens, Olson & Bear LLP

[57] ABSTRACT

An intake system for an engine is disclosed. The intake system is arranged to selectively provide exhaust gas recirculation for improving emission quality. The engine has at least one combustion chamber and an exhaust valve controlled exhaust passage leading from the combustion chamber for routing exhaust therefrom. The intake system includes an intake passage leading to the combustion chamber, an intake valve arranged to control the flow of air into the combustion chamber and a throttle valve positioned in the intake passage upstream of the intake valve. A mechanism is provided for changing the volume of the intake passage between the throttle valve and intake valve for selectively inducing exhaust gas recirculation during an opening overlap of the exhaust and intake valves.

15 Claims, 7 Drawing Sheets

5,983,872

ENGINE INTAKE SYSTEM FOR CONTROLLING INTERNAL EXHAUST GAS RECIRCULATION

FIELD OF THE INVENTION

The present invention relates to an engine intake system. More particularly, the invention is an intake system for an engine arranged to improve emission quality.

BACKGROUND OF THE INVENTION

Engines produce a number of exhaust gases, some of which are considered environmentally undesirable. One of these by-products is $NO_x$ compounds. $NO_x$ compounds are generated during the combustion of hydrocarbon fuels, especially at increased combustion temperatures.

The production of harmful NOx compounds may be reduced by lowering the combustion temperature. One method for lowering the combustion temperature is to route exhaust gas after combustion back into the combustion chamber for mixing with the next air and fuel charge. This exhaust gas displaces some air and fuel charge, thus reducing the heat generated during combustion and thus the combustion temperature.

It is known to route exhaust gas from the exhaust passage leading from the combustion chamber back to the intake passage leading to the combustion chamber through which fuel and air for combustion are supplied. This system is known as an exhaust gas recirculation (EGR) system. Such a system generally comprises a passage leading from the exhaust passage to the intake passage, with the passage of exhaust gas therethrough regulated by a valve. This system is generally referred to as an "external" system since the exhaust gas is routed from the exhaust to the intake passage external of the flow path through the combustion chamber.

The external EGR system has the disadvantage that the exhaust gas which is routed from the exhaust passage to the intake passage is generally diluted with fresh air which fills the exhaust passage between exhaust strokes. Thus, the ratio of exhaust gas to the total amount of gas which is supplied to the intake air and fuel charge is reduced, as is the effectiveness of the exhaust gas recirculation in reducing harmful emissions.

In some situations, exhaust gas flowing from the combustion chamber into the exhaust passage is drawn backwardly into the combustion chamber at the same time the next air and fuel charge is being introduced. This situation generally arises when an intake valve opens the intake passage at the same time as the exhaust valve is open and exhaust is flowing into the exhaust passage.

During a portion of this period when both valves are open, or valve "overlap" as it is called, exhaust gas at high pressure is relieved through the exhaust passage. At the same time, however, the intake pressure within the intake passage leading to the combustion chamber is low, creating a suction effect. The next air and fuel charge naturally flows along the intake passage towards this low pressure area and into the combustion chamber. In addition, because the pressure in the exhaust passage is relatively high, some of the exhaust also flows back through the combustion chamber towards this low pressure area within the intake passage. Because this flow of exhaust gas is through the combustion chamber to the intake passage, it may be referred to as "internal" exhaust gas recirculation.

Unfortunately, this "internal" exhaust gas recirculation situation generally only occurs when the engine is running at low speed, and not at mid and high speeds where excessive heating results in the creation of the undesirable gases and the greater need for exhaust gas recirculation exists. In particular, as the engine speed increases, a throttle which controls the flow of air through the intake passage opens. As the throttle opens, the air pressure within the intake passage approaches atmospheric pressure. This relatively high pressure within the intake passage precludes the flow of exhaust in a direction generally other than directly out the exhaust passage, such that little exhaust gas recirculation occurs. In addition, exhaust gas recirculation at low engine speed may cause an over-dilution of the charge supplied to the combustion chamber in a manner which may cause the engine to misfire and run rough or die.

An improved exhaust gas recirculation system for an internal combustion engine is desired.

SUMMARY OF THE INVENTION

The present invention is an intake system for an engine having at least one combustion chamber and a valve-controlled exhaust port leading from the combustion chamber to exhaust passage for routing exhaust therefrom, the intake system arranged to provide exhaust gas recirculation for improving engine emission quality.

The intake system includes an intake passage leading through an intake port into the combustion chamber of the engine. An intake valve is positioned in the port for controlling the timing of the flow of air therethrough into the combustion chamber. A throttle valve is positioned in the intake passage upstream of the intake valve for controlling the rate of air flow through the intake passage.

Most importantly, the intake passage has a volume between the throttle valve and intake valve. The intake system includes means for changing the volume of the passage between the throttle and intake valves for controlling the pressure within the intake passage and thus selectively inducing exhaust gas recirculation.

Most preferably, the means for changing the volume of the passage is arranged to reduce the volume of the passage when the engine speed is low or the throttle valve opening angle is small, to increase the volume of the passage when the engine speed or throttle valve angle is intermediate, and to again reduce the volume of the passage when the engine speed is high or when the throttle valve angle is large.

In one embodiment, the means for changing the volume comprises a chamber and means for selectively placing the chamber in communication with the chamber. In another embodiment the means comprises a chamber and a piston movably mounted in the chamber for changing the volume of the chamber in communication with the passage. In yet another embodiment, the means comprises a member movable into or out of the passage. In still another embodiment, the means comprises a means for changing the length of the intake passage between the throttle and intake valves.

In accordance with the present invention, when the engine speed or throttle angle are small, the volume of the intake passage is reduced, minimizing the exhaust gas recirculation. This prevents the exhaust gas from diluting the intake charge and interfering with smooth idling. At intermediate engine speeds or when the throttle valve opening angle increases, the increase in intake passage volume has the effect of providing a lower intake passage pressure, causing exhaust gas to recirculate back into the intake passage and combustion chamber for mixing with a fresh air charge. When the engine speed is high or the throttle valve is open, the intake passage volume is again reduced to reduce exhaust gas recirculation so that a charge sustaining high engine output is provided.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

The present invention is an intake system for an engine. The intake system is arranged to selectively cause exhaust gas recirculation during periods of intake and exhaust valve overlap, thereby improving engine performance and emission quality.

Figure 1:
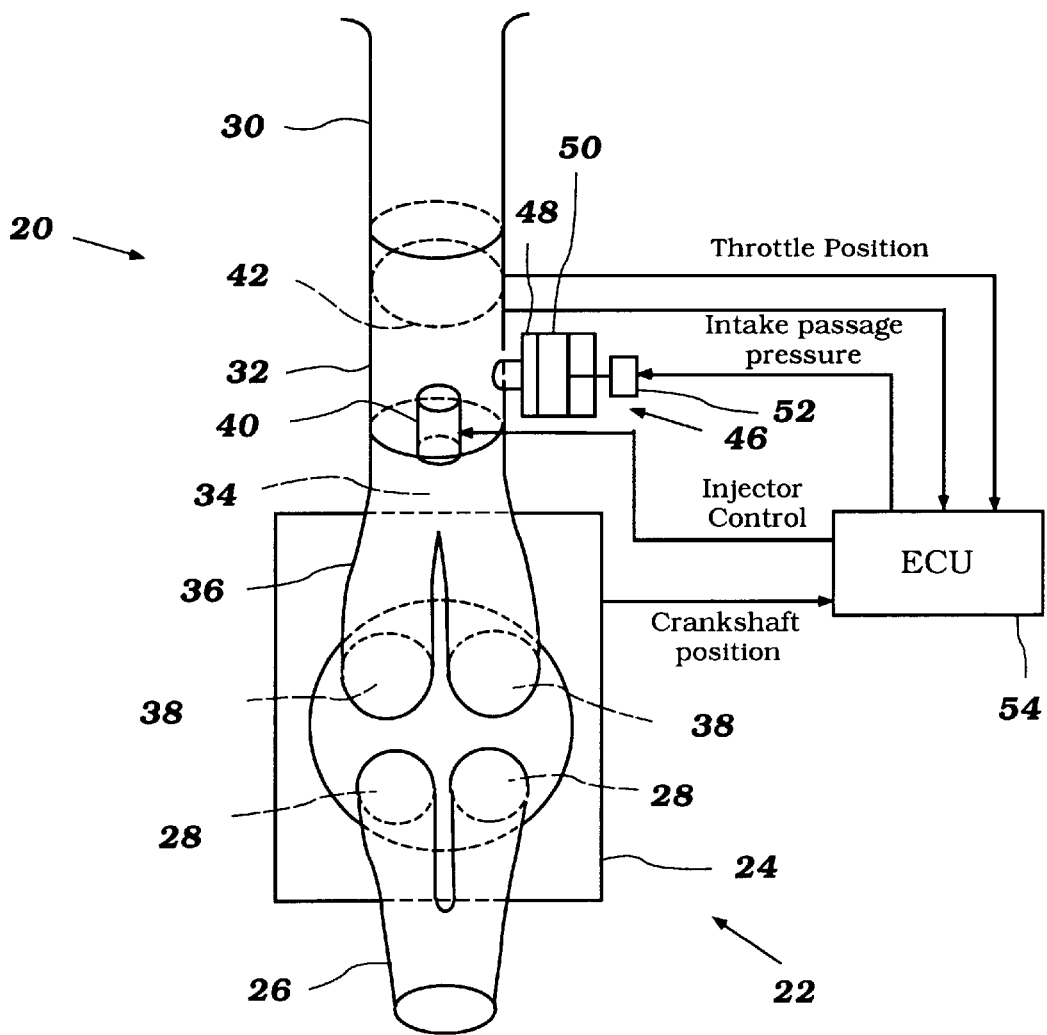
FIG. 1 schematically illustrates an engine having an intake system in accordance with a first embodiment of the present invention.
Figure 2:
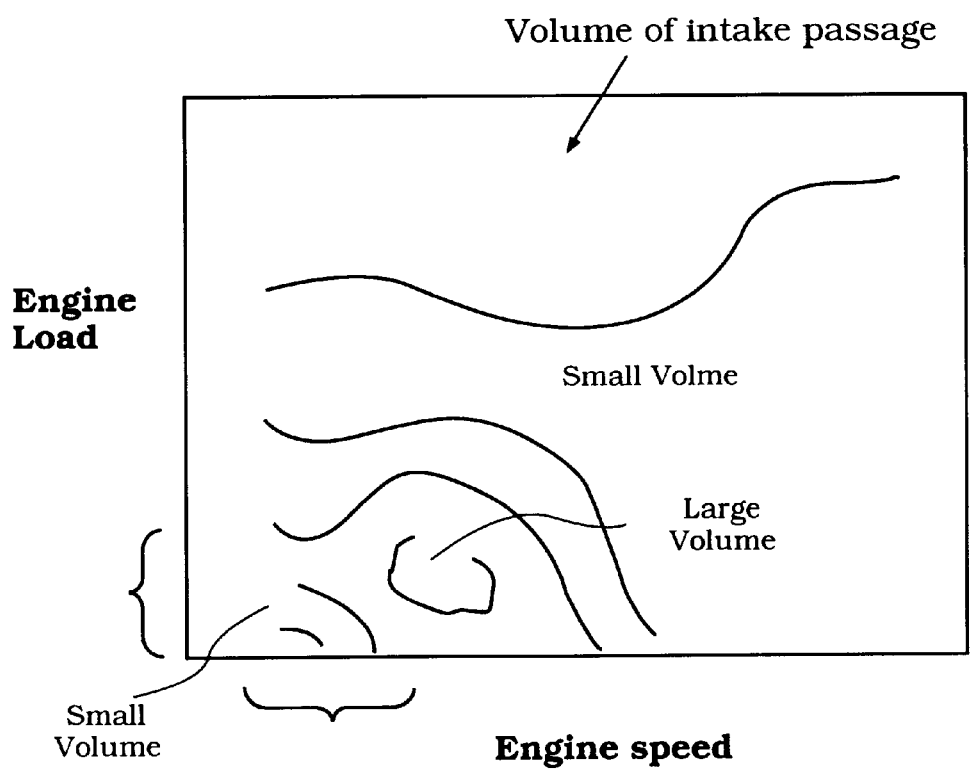
FIG. 2 is a graph illustrating a control strategy associated with the intake system illustrated in FIG. 1.

FIGS. 1 and 2 illustrate an intake system 20 for an engine 22 in accordance with a first embodiment of the present invention. The engine 22 is preferably operates on a four-cycle operating principle. The engine 22 illustrated has a single cylinder 24. The engine 22 may have multiple cylinders, however, and may operate in accordance with other operating cycles, as will be appreciated by those skilled in the art.

The engine 22 includes an exhaust passage 26 leading from the cylinder 24 through which exhaust is routed from the cylinder after combustion has occurred therein. As illustrated, the exhaust passage 26 is branched, thus defining two exhaust ports leading from the cylinder 24. Means are preferably provided for controlling the flow of exhaust from the cylinder 24 through the exhaust ports and into the exhaust passage 26. Preferably, this means comprises an exhaust valve 28 movably positioned in each branch of the exhaust passage 26. Each exhaust valve 28 is movable between a first position in which the valve closes the port and prevents the flow of exhaust from the cylinder 24 into the exhaust passage 26, and a second position in which the port is open and exhaust may flow from the cylinder 24 into the exhaust passage 26.

Means are provided for moving each exhaust valve 28 in a timed manner, as is well known to those skilled in the art.

As also well known, the exhaust system may include but a exhaust single port or more than two ports.

Air is supplied to the cylinder 24 of the engine 22 through the intake system 20. Preferably, the intake system 20 includes an intake passage 34 extending through an intake pipe 30 and a throttle body 32 to the cylinder 24. The intake passage 34 may be defined partly by an intake manifold coupled to the throttle body 32 and/or another portion of the engine 22 such as a cylinder head.

As illustrated, the intake passage 34 branches proximate the cylinder 24, each branch defining an intake port 36 at the cylinder 24. Means are provided for controlling the flow of air into the cylinder 24. Preferably, this means comprises an intake valve 38 movably positioned to selectively open or close the intake port 36.

Means are provided for moving each intake valve 38 in a timed manner, as is well known to those skilled in the art. The intake system 20 may include but a single intake port or more than two, as well known to those skilled in the art.

Preferably, the timing of the opening and closing of the exhaust and intake valves 28, 38, is such that there is a period of valve overlap. In other words, there is a time during which the exhaust and intake valves 28, 38 are both open and the exhaust and intake passages 26, 34 corresponding thereto are unobstructed.

Means are provided for introducing fuel into the cylinder 24 for combustion. Preferably, fuel is delivered into the air passing through the throttle body 32 by a fuel delivery apparatus 40. This apparatus 40 may comprise a carburation type device incorporated into the throttle body 32, or one or more fuel injectors, as well known to those skilled in the art.

Means are also provided for controlling the rate of air flow through the intake system 20 to the intake ports 38. Preferably, this means comprises a throttle valve 42 positioned in the passage through the throttle body 32. The valve 42 may be of the well-known butterfly variety, moveable between one position in which the valve 42 generally closes the passage, and a second passage in which the passage is open. Preferably, the valve 42 is controlled remotely by an operator of the engine 22, such as with a throttle control.

The valve 42 is preferably moveable between a first position in which it generally closes the passage, referred to herein as a small opening angle, and second position in which the valve is generally open, referred to herein as a large opening angle, and intermediate positions therebetween.

In accordance with the present invention, the intake system 20 includes means 46 for changing the volume of the intake passage 34, and preferably that portion of the intake passage 34 between the throttle valve 42 and the intake valves 38.

In the first embodiment of the engine 22 illustrated in FIG. 1, this means comprises an air chamber 48 in communication with the intake passage 34, a piston 50 movably positioned in the chamber 48, and means for moving the piston 50 so as to change the volume of the chamber 48.

As illustrated, the chamber 48 is in communication with the intake passage 34 in that portion of the passage 34 between the throttle valve 42 and the intake valves 38. The chamber 48 may be defined by the throttle body 32 or by a separate element connected thereto, as may be appreciated by those skilled in the art.

The piston 50 is movably mounted in the chamber 48. The piston 50 separates the chamber 44 into a first or front portion which is in communication with the intake passage 34, and a second or rear portion behind the piston which is not in communication with the intake passage 34. The piston 50 is movable between a first position in which the volume of the first or front portion of the chamber 48 in communication with the intake passage 34 is small. In FIG. 1, this is a position in which the piston 50 is moved to the left-hand side of the chamber 48. In its second position, the volume of the first or front portion of the chamber 48 in communication with the intake passage 34 is large. In FIG. 1, this is a position in which the piston 50 is moved to the right-hand side of the chamber 48.

The means for moving the piston 50 preferably comprises an actuator 52, such as a motor-driven actuating device, as known to those skilled in the art.

Control means are provided for changing the volume of the intake passage 34 with the means 46. Preferably, this control means comprises an electronic control unit or ECU 54. As illustrated, the ECU 54 is arranged to control the introduction of fuel into the air, by controlling the fuel delivery device 40 (indicated as a fuel injector in FIG. 1).

Preferably, the ECU 54 receives information such as throttle valve position, the pressure of the air within the intake passage, and the crankshaft position (for example, where a piston is movably mounted in the cylinder 24 and connected to a rotating crankshaft, so that the angular position of the crankshaft yields the position of the position). This and other data may be provided from a variety of sensors, as well known to those skilled in the art.

The ECU 54 uses this and/or other data and, in accordance with a control strategy, controls the fuel delivery device 40 to provide the correct amount of fuel at the correct time.

In addition, the ECU 54 controls the actuator 52 which controls the position of the piston 50 in accordance with a control strategy which is illustrated in FIG. 2. This control strategy may be provided in a read-only map type structure associated with the ECU 54.

First, if the engine 22 is operating at a low speed and/or low load condition or when the throttle opening angle is small, such as at idle, the volume of the intake passage 34 is kept small. In other words, the ECU 54 instructs the actuator 52 to move the piston 50 to a position in which the portion of the chamber 48 in communication with the intake passage 34 is small (i.e. the piston is moved to the left in FIG. 1).

Second, as the engine 22 speed and/or load increase to a mid-range or when the throttle opening angle increases, the volume of the intake passage 34 is increased. In other words, the ECU 54 instructs the actuator 52 to move the piston 50 to a position in which the portion of the chamber 48 in communication with the intake passage 34 is large (i.e. the piston is moved to the right in FIG. 1).

As the engine 22 speed and/or load further increase to a high speed and/or high load condition or when the throttle opening angle is large, the volume of the intake passage 34 is again reduced. In other words, the ECU 54 instructs the actuator 52 to move the piston 50 to a position in which the portion of the chamber 48 in communication with the intake passage 34 is small (i.e. the piston is moved back to the left in FIG. 1).

The following effects are observed with the air intake system 20 arranged as described above. First, when the engine 22 is operating at low speed and/or low load, such as at idle, the throttle valve 42 is generally closed and the volume of the intake system between the throttle valve 42 and intake valves 38, as including the air chamber 48, is small. At this time, the pressure in the intake passage remains relatively high, and little exhaust gas recirculation occurs during the valve overlap. This is advantageous since the exhaust gas does not dilute the incoming air and fuel charge, permitting smooth idling.

When the engine 22 is operating at a higher, mid-range speed and/or load, the volume of the intake system between the throttle valve 42 and intake valves 38 is increased with the air chamber 48. As the intake volume increases, the intake pressure decreases. This decrease in the pressure in this portion of the intake passage 34 has two distinct advantages. First, air is more effectively drawn through the air intake pipe 30, thus permitting the throttle valve 42 to remain more closed as compared to an intake passage 34 which is of smaller volume. In addition, because the amount of air necessary for combustion can be provided at a smaller throttle valve opening angle, the pressure within the intake passage 34 between the throttle valve 42 and intake valves 38 during the intake cycle is low. Because of this low pressure, during the valve overlap, exhaust is effectively drawn backwardly through the cylinder 24 into the intake passage 34 and mixes with the incoming fresh air. The resulting charge supplied to the cylinder 24 is thus diluted somewhat, lowering the temperature of combustion and reducing the production of harmful emissions such as $NO_x$.

It has been found that the exhaust gas which is first or last to leave the combustion chamber during the exhaust cycle is generally that containing the most unburned hydrocarbons. In accordance with the present invention, the exhaust gas which is recirculated is generally that which is the last in the combustion chamber. Thus, this hydrocarbon rich exhaust is recirculated and then burned in the next combustion cycle, reducing the amount of harmful hydrocarbons which are exhausted.

In a high speed and/or high engine load condition, the volume of the throttle valve 42 is opened to or nearly to its fully open position. At this time, the volume of the intake passage 34 including the chamber 48 is reduced, at least as compared to the volume during the mid-range speed and/or load condition. At this time, efficient combustion requires large quantities of air supplied to the cylinder 24. This is accomplished since the throttle valve 42 does not obscure the intake passage 34. In addition, little exhaust gas is drawn back through the cylinder 24 into the intake passage 34, since the pressure within the intake passage 34 is raised. Since little exhaust gas is drawn back, the exhaust gas does not displace the fresh air and otherwise interfere with the combustion.

Figure 3:
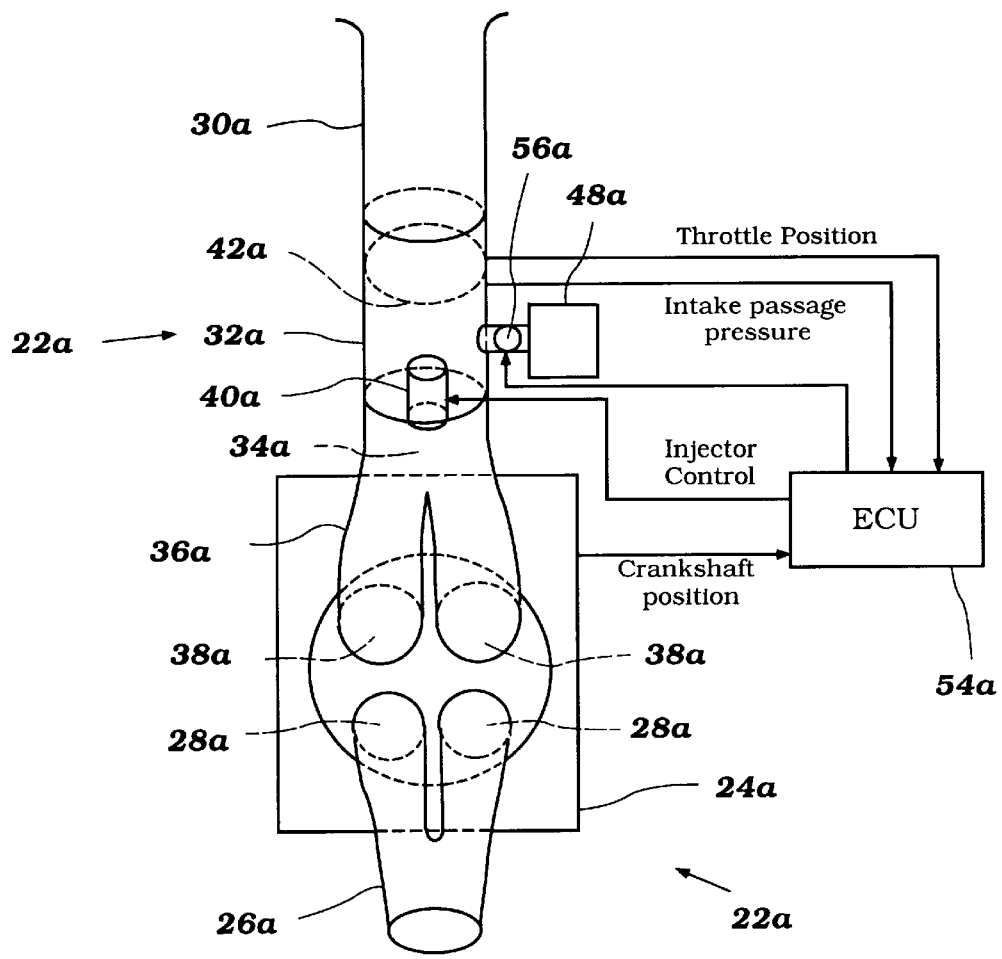
FIG. 3 schematically illustrates an engine having an intake system in accordance with a second embodiment of the present invention.
Figure 4:
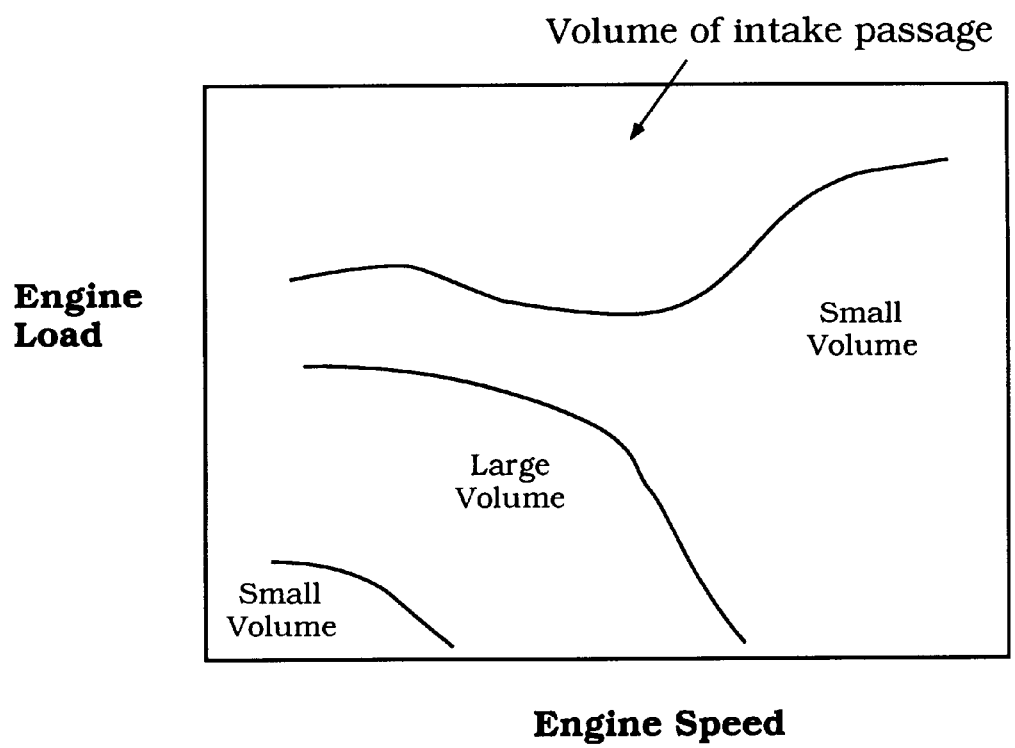
FIG. 4 is a graph illustrating a control strategy associated with the intake system illustrated in FIG. 2.

FIGS. 3 and 4 illustrate an intake system 20a arranged in accordance with a second embodiment of the present invention. This intake system 20a is similar to that illustrated in FIGS. 1 and 2, and therefore similar parts have been given like reference numerals to those used in that embodiment, except that an "a" designator has been added to all of the reference numerals of this embodiment.

In accordance with this embodiment, a control valve 56a is used to control the connection of the air chamber 48a with the portion of the intake passage 34a between the throttle valve 42a and the intake valves 38a. In particular, the valve 56a is moveable between a first position in which the chamber 48a is in communication with the intake passage 34a, and a second position in which it is not.

The valve 56a is preferably operated by an actuating device (not shown) by an ECU 54a or similar control in accordance with a control strategy which is similar to that described above and illustrated in FIG. 4.

This embodiment intake system 20a has generally the same advantages as the first embodiment, and simply includes a different mechanism for controlling the effective size of the intake passage 34a.

Figure 5:
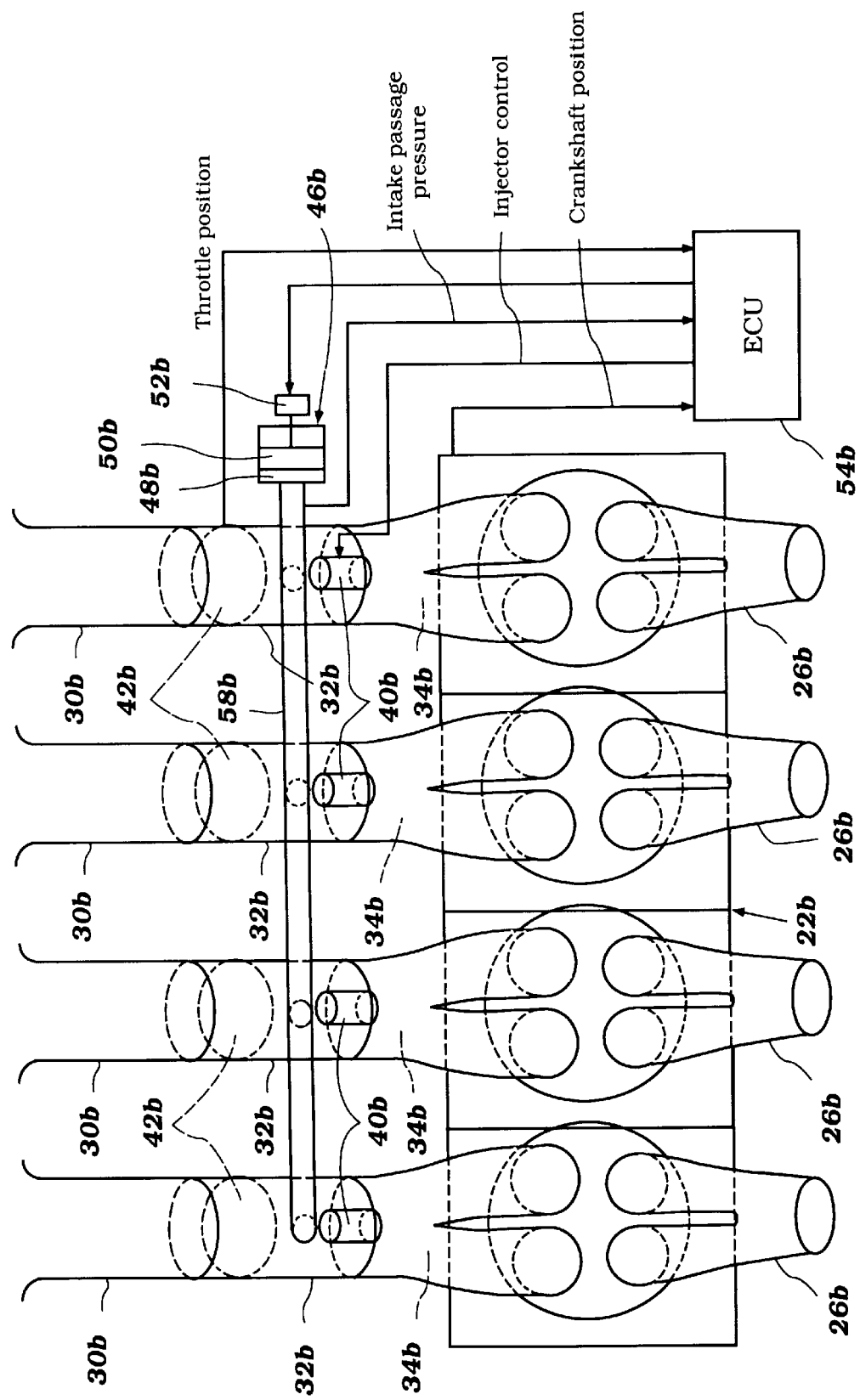
FIG. 5 schematically illustrates a multi-cylinder engine having an intake system in accordance with a third embodiment of the present invention.

FIG. 5 illustrates an intake system 20b arranged in accordance with a third embodiment of the present invention. This intake system 20b is similar to that illustrated in FIGS. 1 and 2, and therefore similar parts have been given like reference numerals to those used in that embodiment, except that a "b" designator has been added to all of the reference numerals of this embodiment.

FIG. 5 illustrates how the intake system similar to that illustrated in FIG. 1 may be adapted to control an engine 22b having multiple cylinders. In this embodiment, the engine 22b has four cylinders. An intake passage 34b provides air to each cylinder, and means are provided for increasing and decreasing the volume of that portion of each intake passage 34b between a throttle valve 42b and an intake valve. Preferably, this means comprises a chamber 48b in communication with each intake passage 34b through a pipe or passage 58b. Again, a piston 50b is movably mounted in the chamber 48b for controlling the volume of the chamber 48b in communication with the intake passages 34b.

An ECU 54b controls an actuator 52b which controls the position of the piston 50b in a manner similar to that described above in conjunction with the first embodiment. The ECU 54b preferably controls the actuator 52b in accordance with a similar control strategy as described therein as well.

Figure 6:
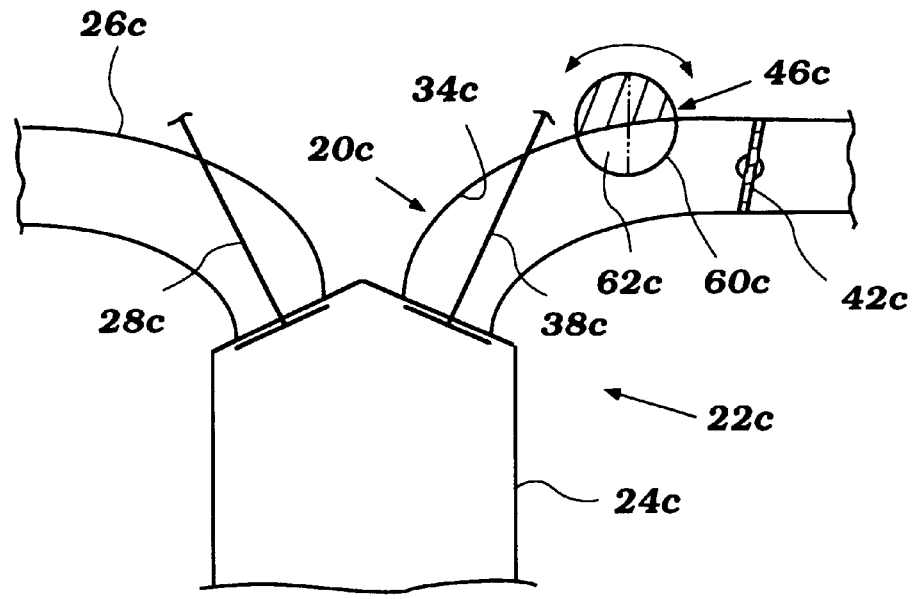
FIG. 6 schematically illustrates an engine having an intake system in accordance with a fourth embodiment of the present invention.

FIG. 6 illustrates an intake system 20c arranged in accordance with a fourth embodiment of the present invention. This intake system 20c is similar to that illustrated and described in the embodiments above, and therefore similar parts have been given like reference numerals to those used therein, except that a "c" designator has been added to all of the reference numerals of this embodiment.

In this embodiment, the means 46c for changing the volume of that portion of the intake passage 34c between the throttle valve 42c and intake valves 38c comprises a valve member 60c. As illustrated, the valve member 60c is a rod-like member having a cut-out section 62c. The valve member 60c is movably mounted with respect to the intake passage 34c such that in a first position (as illustrated in FIG. 6), it does not extend into or occupies very little of the intake passage 34c between the throttle valve 42c and intake valves 38c. In a second position, the valve member 60c (as illustrated by the phantom lines in FIG. 6) obscures or occupies a portion of the intake passage 34c between the throttle valve 42c and intake valves 38c, thus reducing the volume of the passage 34c.

Means are provided for moving the valve member 60c between its two positions in accordance with a control strategy similar to that illustrated and described in conjunction with the first embodiment of the present invention. In this accordance with this embodiment, when its is desired that the volume of the intake passage 34c be small, the valve member 60c is rotated to its second position. When it is desired to increase the volume of the intake passage 34c, the valve member 60c is rotated to its position as illustrated in FIG. 6.

Of course, and as may be appreciated by those skilled in the art, other members may be provided instead of the movable rod-like valve member 60c, such as a sliding block or the like.

Figure 7:
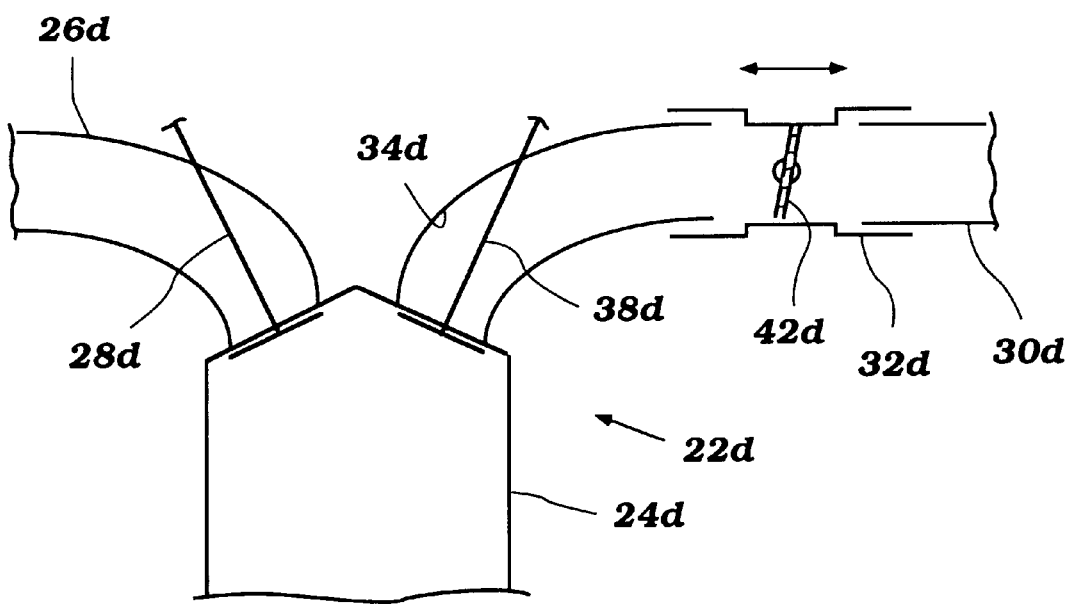
FIG. 7 schematically illustrates an engine having an intake system in accordance with a fifth embodiment of the present invention.

FIG. 7 illustrates an intake system 20d arranged in accordance with a fifth embodiment of the present invention. This intake system 20d is similar to that illustrated and described in the embodiments above, and therefore similar parts have been given like reference numerals to those used therein, except that a "d" designator has been added to all of the reference numerals of this embodiment.

In this embodiment, the means for changing the volume of that portion of the intake passage 34d between the throttle valve 42d and intake valves 38d comprises a means for increasing the length of the passage 34d therebetween. Preferably, the throttle body 32d is movable with respect to the intake pipe 30d and the engine 22d. In a first position, the throttle body 32d is positioned closer to the cylinder 24d along the intake passage 34d, thereby shortening the intake passage 34d and reducing its volume between the throttle valve 42d and intake valves 38d. In a second position, the throttle body 32d is moved in the direction of the intake pipe 30d, thereby lengthening the intake passage 34d between the throttle valve 42d and the intake valves 38d, increasing the volume of the passage 34d.

Means are provided for moving the throttle body 34d, such as a actuator (not shown), as will be appreciated by those skilled in the art. Preferably, the throttle body 34d is moved in accordance with a control strategy similar to that described above in conjunction with the first embodiment.

It is contemplated that other means may be provided for increasing the length of the intake passage 34d between the throttle valve 42d and the intake valves 38d, as may be appreciated by those skilled in the art. For example, a portion of one of the members defining the intake passage 34d may comprises an accordion-like structure which may be shortened or lengthened.

Figure 8:
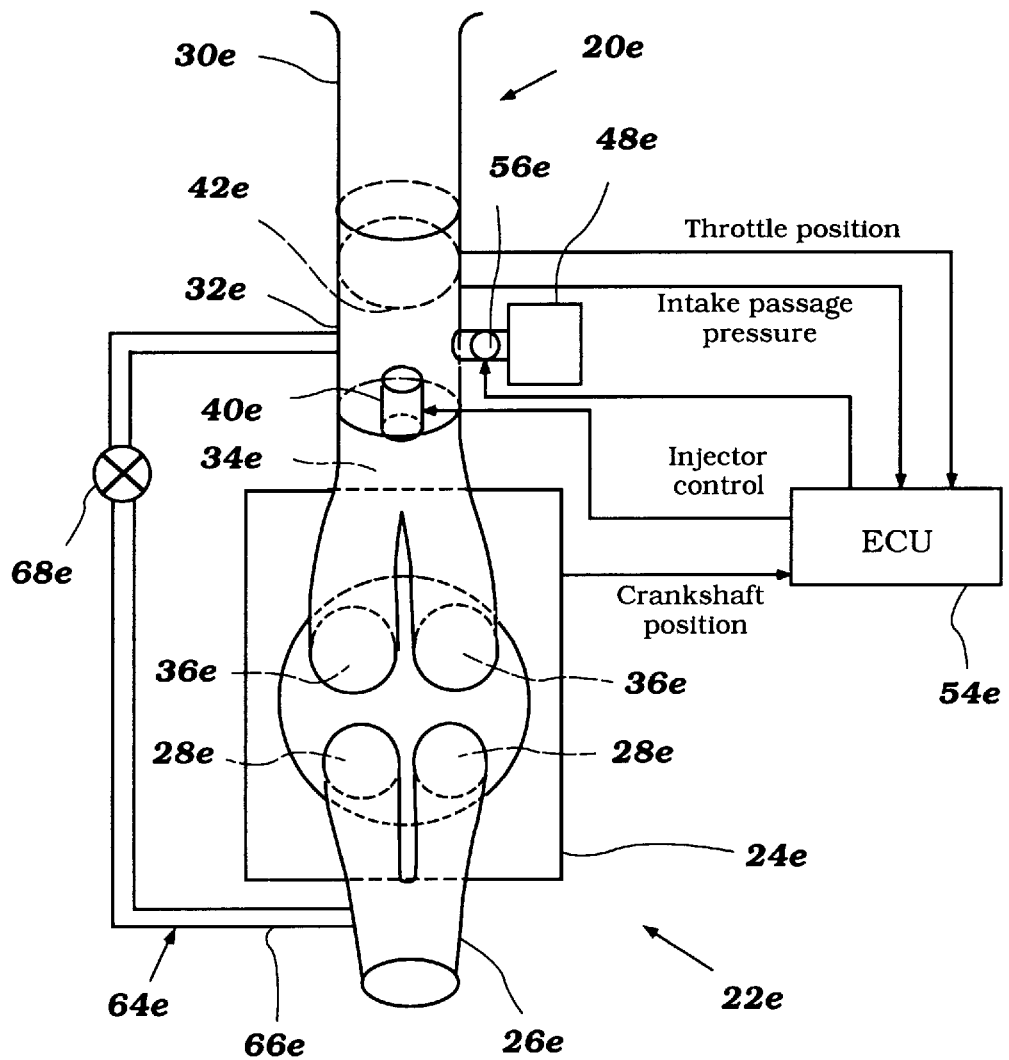
FIG. 8 schematically illustrates an engine having an intake system in accordance with a sixth embodiment of the present invention.

FIG. 8 illustrates an intake system 20e arranged in accordance with a sixth embodiment of the present invention. This intake system 20e is similar to that illustrated and described in the embodiments above, and therefore similar parts have been given like reference numerals to those used therein, except that an "e" designator has been added to all of the reference numerals of this embodiment.

In this embodiment of the invention, an external exhaust gas return or circulation system 64e is provided as part of the intake system 20e. In particular, an exhaust gas recirculation line 66e extends from the exhaust passage 26e to the intake passage 34e. A control valve 68e is provided along the line 66e for controlling the flow of exhaust therethrough.

Preferably, the valve 68e is arranged to allow more exhaust gas to flow into the intake passage 34e as the throttle valve opening angle increases.

The intake system 20e is otherwise preferably similar to that described and illustrated above, as including means for changing the volume of that portion of the intake passage 34e between a throttle valve 42e and the intake valves 38e. In the embodiment illustrated, this means is similar to the means described in conjunction with the second embodiment of the invention as illustrated in FIG. 3.

This arrangement has the advantage that, if the valve overlap period is very small thus preventing large amounts of internal exhaust gas recirculation, additional exhaust gas recirculation is provided externally. In addition, in that situation, the volume of the chamber or the like used to increase the volume of the intake passage may be made smaller since the amount of exhaust gas recirculation which needs to be effected thereby can be reduced.

Of course, the foregoing description is that of preferred embodiments of the invention, and various changes and modifications may be made without departing from the spirit and scope of the invention, as defined by the appended claims.

What is claimed is:

1. An intake system for an engine having at least one combustion chamber, an exhaust passage leading from said combustion chamber for routing exhaust therefrom, at least one exhaust valve for controlling the flow of exhaust from said combustion chamber to said exhaust passage, said intake system including an intake passage leading to said combustion chamber and at least one intake valve for controlling the flow of air into said combustion chamber, a throttle valve positioned in said intake passage upstream of said at least one intake valve for controlling the flow of air therethrough, the intake passage having a volume between said throttle valve and said at least one intake valve, means for sensing an engine running condition, said intake system including means for changing said volume in response to changes in said sensed engine running condition for selectively controlling the amount of internal exhaust gas recirculation during a period of exhaust and intake valve opening overlap dependent upon the sensed engine running condition.

2. The intake system in accordance with claim 1, wherein said means for changing comprises a chamber in communication with said intake passage and a valve for selectively opening and closing the communication of said chamber with said intake passage.

3. The intake system in accordance with claim 1, wherein said means for changing comprises a chamber in communication with said intake passage and a piston movably mounted in said chamber for varying the effective volume of said chamber.

4. The intake system in accordance with claim 1, wherein said intake passage has a length between said throttle valve and said at least one intake valve, and wherein said means for changing comprises means for changing said length of said intake passage between said throttle valve and said at least one intake valve.

5. The intake system in accordance with claim 4, wherein said intake passage is defined by a throttle body movably connected to an intake pipe, and wherein said means for changing said length of said intake passage comprises means for moving said throttle body with respect to said intake pipe.

6. The intake system in accordance with claim 1, wherein said means for changing said volume comprise a member selectively moveable into and out of said passage between said first valve means and said intake port.

7. The intake system in accordance with claim 1, wherein the sensed engine running condition comprises engine speed and said means for changing said volume includes means for reducing said volume when a speed of said engine is at a first low speed and means for increasing said volume as said speed of said engine increases to a second speed.

8. The intake system in accordance with claim 7, wherein said means further includes means for reducing said volume as said speed of said engine exceeds said second speed.

9. The intake system in accordance with claim 1, further including a recirculation passage leading from said exhaust passage to said intake passage and means for controlling a flow of exhaust through said passage.

10. The intake system in accordance with claim 9, wherein said means for controlling a flow of exhaust includes means for increasing a flow of exhaust dependent on a position of said throttle valve.

11. The intake system in accordance with claim 1, wherein said throttle valve is moveable between a closed position and an open position, the sensed engine running condition comprises throttle valve position and said means for changing is arranged to reduce said volume of said passage when said throttle valve is generally closed.

12. The intake system in accordance with claim 11, wherein said means for changing is arranged to increase said volume of said passage when said throttle valve is between its open and closed position.

13. The intake system in accordance with claim 11, wherein said means for changing is arranged to reduce said volume of said passage when said throttle valve is generally open.

14. An intake system for an engine having at least one combustion chamber, an exhaust passage leading from said combustion chamber for routing exhaust therefrom, at least one exhaust valve for controlling the flow of exhaust from said combustion chamber to said exhaust passage, said intake system including an intake passage leading to said combustion chamber and at least one intake valve for controlling the flow of air into said combustion chamber, a throttle valve positioned in said intake passage upstream of said at least one intake valve for controlling the flow of air therethrough, the intake passage having a volume between said throttle valve and said at least one intake valve, said intake system including means for controlling a pressure within said intake passage in response to changes in a sensed engine running condition for controlling an amount of exhaust gas recirculation.

15. The intake system in accordance with claim 14, wherein said means for controlling a pressure comprises means for increasing said volume of said intake passage.

* * * * *